United States Patent [19]

Fayard

[11] Patent Number: 4,850,327
[45] Date of Patent: Jul. 25, 1989

[54] DEVICE FOR IMPROVING THE FEED OF DIESEL ENGINES AT LOW TEMPERATURES

[75] Inventor: Jean-Claude Fayard, Lyon, France

[73] Assignee: Elf France, Courbevoie, France

[21] Appl. No.: 179,627

[22] Filed: Apr. 8, 1988

[30] Foreign Application Priority Data

Apr. 8, 1987 [FR] France ................................. 87 04930

[51] Int. Cl.⁴ ........................ F02M 31/00; F02M 39/00
[52] U.S. Cl. ...................................... 123/557; 123/514
[58] Field of Search ............... 123/557, 514, 510, 511, 123/512, 447, 516

[56] References Cited

U.S. PATENT DOCUMENTS

| | | | |
|---|---|---|---|
| 2,719,518 | 10/1955 | Newman | 123/557 |
| 3,472,214 | 10/1969 | Moon | 123/557 |
| 4,180,036 | 12/1979 | Wolf | 123/557 |
| 4,371,149 | 3/1983 | Naylor | 123/557 |
| 4,509,464 | 4/1985 | Hansen | 123/557 |

FOREIGN PATENT DOCUMENTS

| | | | |
|---|---|---|---|
| 973439 | 8/1925 | Canada | 123/557 |
| 2841249 | 4/1980 | Fed. Rep. of Germany | 123/557 |
| 3442980 | 5/1986 | Fed. Rep. of Germany | 123/514 |
| 1300180 | 3/1982 | U.S.S.R. | 123/557 |

*Primary Examiner*—Carl Stuart Miller
*Attorney, Agent, or Firm*—Oblon, Spivak, McClelland, Maier & Neustadt

[57] ABSTRACT

A device for improving the feed of diesel engines at low temperatures, particularly at temperatures less than the cloud point of gas oils, without modifying the specific chemical characteristics of the gas oil by recycling the scavenging flow from the injection pump, characterized in that recycling takes place either upstream of the fuel filter and is associated with recirculation towards the reservoir of the gas oil coming from the reservoir through a heat exchanger or directly in the direction of the reservoir with direct feed of the filter by the reservoir.

4 Claims, 3 Drawing Sheets

DEVICE FOR IMPROVING THE FEED OF DIESEL ENGINES AT LOW TEMPERATURES

BACKGROUND OF THE INVENTION

1. Field of the Invention

The present invention relates to a device for improving the feed of diesel engines at low temperatures, particularly at temperatures lower than the clouding point of gas oils without modifying the specific chemical characteristics of the gas oil.

2. Discussion of the Background

The use of gas oil in diesel engines at temperatures lower than the cloud point temperature raises a number of operating problems linked to clogging of the filter. The clouding point corresponds to the temperature where crystallization of the paraffins occurs within the gas oil. For temperatures less than this clouding point temperature, if no heating means are provided, these paraffins will be stopped by the fuel filter, during operation of the engine, and will concentrate until the filter is clogged, thus causing a stoppage of the engine through lack of feed.

A solution for overcoming these drawbacks is to modify the specifications of the engine gas oil depending on the seasons, i.e. the clouding point, the flow point and the limit temperature of filterability. For economic reasons, gas oils never have characteristics sufficient for complying with the operating requirements imposed by the lowest temperatures met with. Thus, if it is desired to eliminate all the operating problems of diesel engines at low temperatures, heating devices will have to be associated therewith.

A heating device for recycling the excess gas oil flow from the injection pump, called "scavenging flow", upstream of the fuel filter, by means of a thermostatic valve is disclosed in the French patent application No. 2 456 223, filed in the name of ELF UNION. In this device, after a short operating time of the engine, the gas oil from the scavenging flow has reached a sufficient temperature so that, mixed with the gas oil coming from the reservoir, the mixture is fed to the injection pump at about 25° Celsius. The thermostatic element then regulates the scavenging flow so as to maintain the temperature constant while recycling a more or less large amount of gas oil to the reservoir. For temperatures greater than 25° Celsius, the thermostatic element recycles the entire scavenging flow to the reservoir. Under these circumstances, the gas oil, still at temperatures close to the clouding point in the reservoir, will be fed directly from the reservoir to the thermostatic element, the filter then the high pressure pump, which causes an oscillatory phenomenon which further slows down heating of the gas oil contained in the reservoir.

A device is also known, from French patent application No. 2 256 323, for preheating the gas oil using the exhaust gases of the engine in an exchanger before feeding it into the injection pump. However, this device plays the same role as the preceding device using the scavenging flow and does not solve the problem of heating the gas oil in the reservoir and cooling of the injection pump by the scavenging flow.

SUMMARY OF THE INVENTION

The object of the present invention is to provide an improvement using the principle of recycling the scavenging flow, while overcoming the above-mentioned drawbacks of the prior art.

This first aim is attained by the fact that the device for improving the feed of diesel engines at low temperatures, particularly temperatures lower than the clouding point of the gas oils, without modifying the specific chemical characteristics of the gas oil, by recycling the scavenging flow from the injection pump, is characterized in that recycling takes place either upstream of the fuel filter and is associated with recirculation to the reservoir of the gas oil coming from the reservoir through a heat exchanger or dirrectly to the reservoir with direct feeding of the filter by the reservoir.

In an advantageous arrangement, the recycling is controlled by a thermoelectric element placed at the outlet of the reservoir and controlling the action of an excess pressure pump causing, on the one hand by opening a valve, recycling of the scavenging flow upstream of the filter and, on the other hand, recirculation to the reservoir of the gas oil coming from the reservoir through a heat exchanger. Another characteristic concerns the provision of a differential valve which places the reservoir in communication either with the heat exchanger or directly with the filter.

According to another characteristic, a one-way or non return valve is disposed between the overpressure pump and a return duct to the reservoir connected to the scavenging outlet of the injection pump.

Another object of the invention is to provide an improvement which makes possible both cold starting and heating of the gas oil in the reservoir, while providing operating conditions such that the injection pump is not subjected to excessive heating.

This object is attained by the fact that a thermostatic element places the heat exchanger in direct communication with the upstream portion of the filter.

BRIEF DESCRIPTION OF THE DRAWINGS

Other advantages and features of the present invention will appear more clearly from reading the following description with reference to the accompanying drawings in which.

DESCRIPTION OF THE PREFERRED EMBODIMENTS

Figure 1:
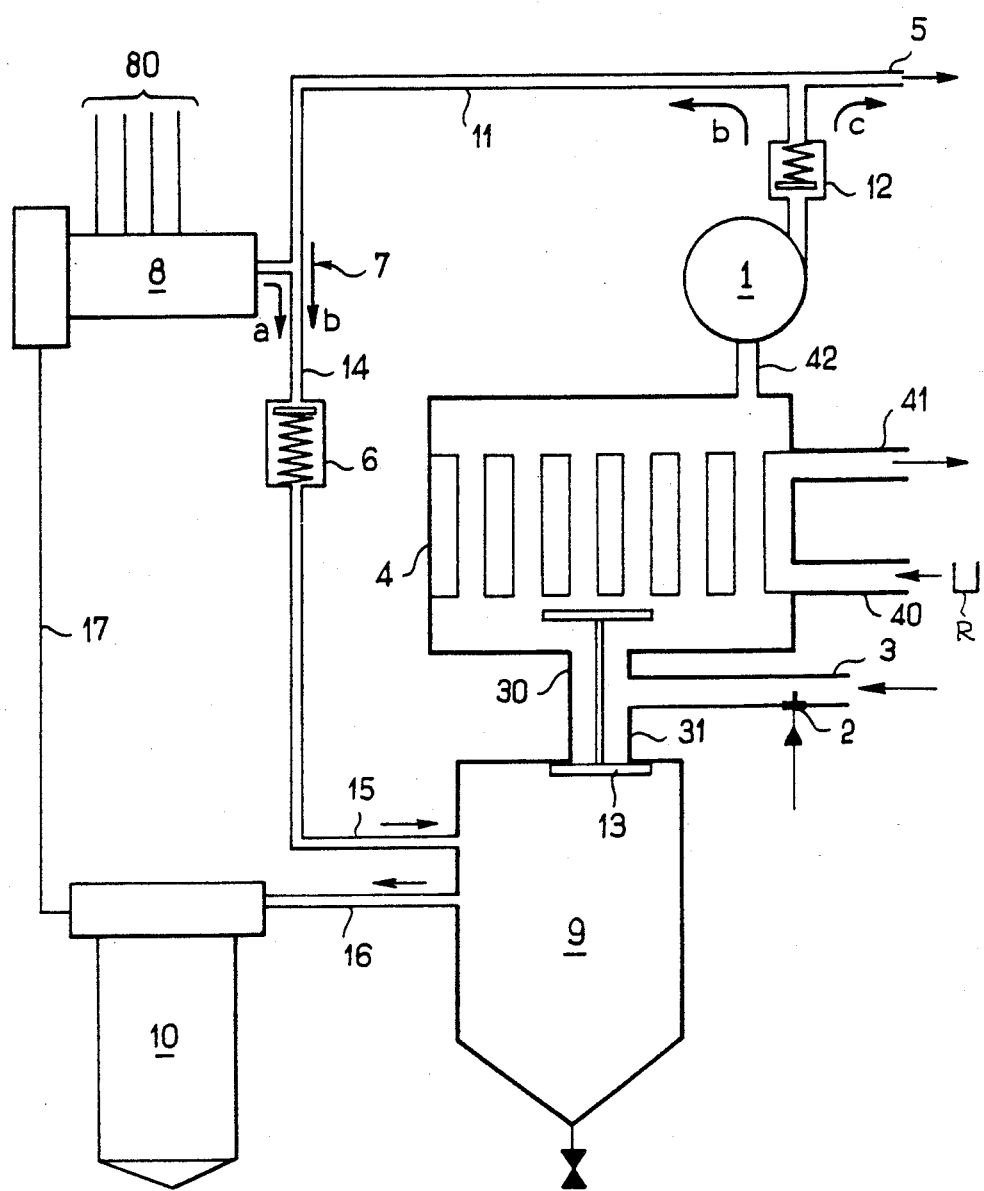
FIG. 1 shows schematically the improvement of the invention in its operating mode during the gas oil heating phase.

FIG. 1 shows the entire of the device forming the improvement of the present invention and comprising a duct 3 for conveying the gas oil contained in a reservoir (not shown) either to an exchanger 4 through a duct 30,or to a mixing pot 9 through a duct 31. The selection of feeding the gas oil into exchanger 4 or into the mixing pot 9 is provided by a differential valve 13. A duct 40 brings the water circulating in the engine to the exchanger 4, whereas a duct 41 removes this circulating water. An outlet 42 of exchanger 4 is connected to the inlet of an excess pressure 1 whose outlet is connected through a first one-way nonreturn valve 12 to a first duct 11 and a second duct 5. The second duct 5 is in communication with a gas oil reservoir R. The first duct 11 places pump 1 in communication with the scavenging flow outlet 7 of a high pressure pump 8, called a injection pump. This injection pump 8 delivers, through its ducts 80, the gas oil which is fed to the injectors, (not shown). The scavenging outlet 7 is in communication through a duct 14 with a second one-way or non return valve 6 and is connected through a duct 15 to the mixing pot 9. This nonreturn valve 6 places the scavenging outlet 7 in communication with the mixing pot 9. This nonreturn valve places the scavenging outlet 7 in communication with the mixing pot 9 when a sufficient excess pressure is present in duct 14. The mixing pot 9 communicates through a duct 16 with a filter 10 which is itself in communication, through duct 17, with the injection pump 8. Finally, a thermoelectric element 2, disposed in duct 3, provides control of the start-up of pump 1 as a function of the temperature of the gas oil flowing through duct 3.

The operation of the device will now be described. The electric pump 1, controlled by the thermoelectric element 2 disposed in the gas oil intake duct 3, below a certain temperature close to the clouding point, controls the flow of the cold gas oil through exchanger 4 so as to heat it by the cooling water of the engine. The gas oil from the exchanger 4 is recycled, on the one hand to the reservoir in the direction of arrow c through the return duct 5 and, on the other hand, to the scavenging outlet 7 in the direction of arrow b. The excess pressure at the outlet of the pump causes opening of the two valves 12 and 6. The second valve 6 allows the scavenging flow coming from the outlet 7 of the injection pump 8 to flow in the direction of arrow a while mixing with the gas oil coming from the exchanger 4 and shown by the arrow b. This mixture is recycled in the mixing pot 9 upstream of the filter 10 since, during operation of the pump 1, valve 13 is in the position shown in FIG. 1, which prevents direct feeding of pot 9 from the reservoir through ducts 3 and 31. Thus, in this operating mode of the invention, corresponding to start-up of the engine, the gas oil corresponding to the consumption of the engine will be conveyed by duct 11 because of the outlet pressure of the electric pump 1, whereas the considerable recycled flow at the outlet 7 of the injection pump 8 is mixed with this gas oil so as to heat this latter and recycle it upstream of filter 10. Thus, clogging of the filter will be correspondingly slower since only the gas oil consumed by the engine will be charged with crystallized paraffin. In such operation, the gas oil corresponding to the scavenging flow and heated by passing through the injection pump 8, is used for heating the gas oil coming from the electric pump 1. Furthermore, the gas oil pumped from the reservoir by the electric pump 1 will be progressively heated by the circulating water of the engine.

As the temperature of the cooling water of the engine rises, the gas oil will be heated and a part thereof will be recycled to the reservoir for heating the gas oil in the reservoir. This makes it possible to pass above the temperature of the clouding point and to reliably eliminate the problem of clogging of the filter 10.

Figure 2:
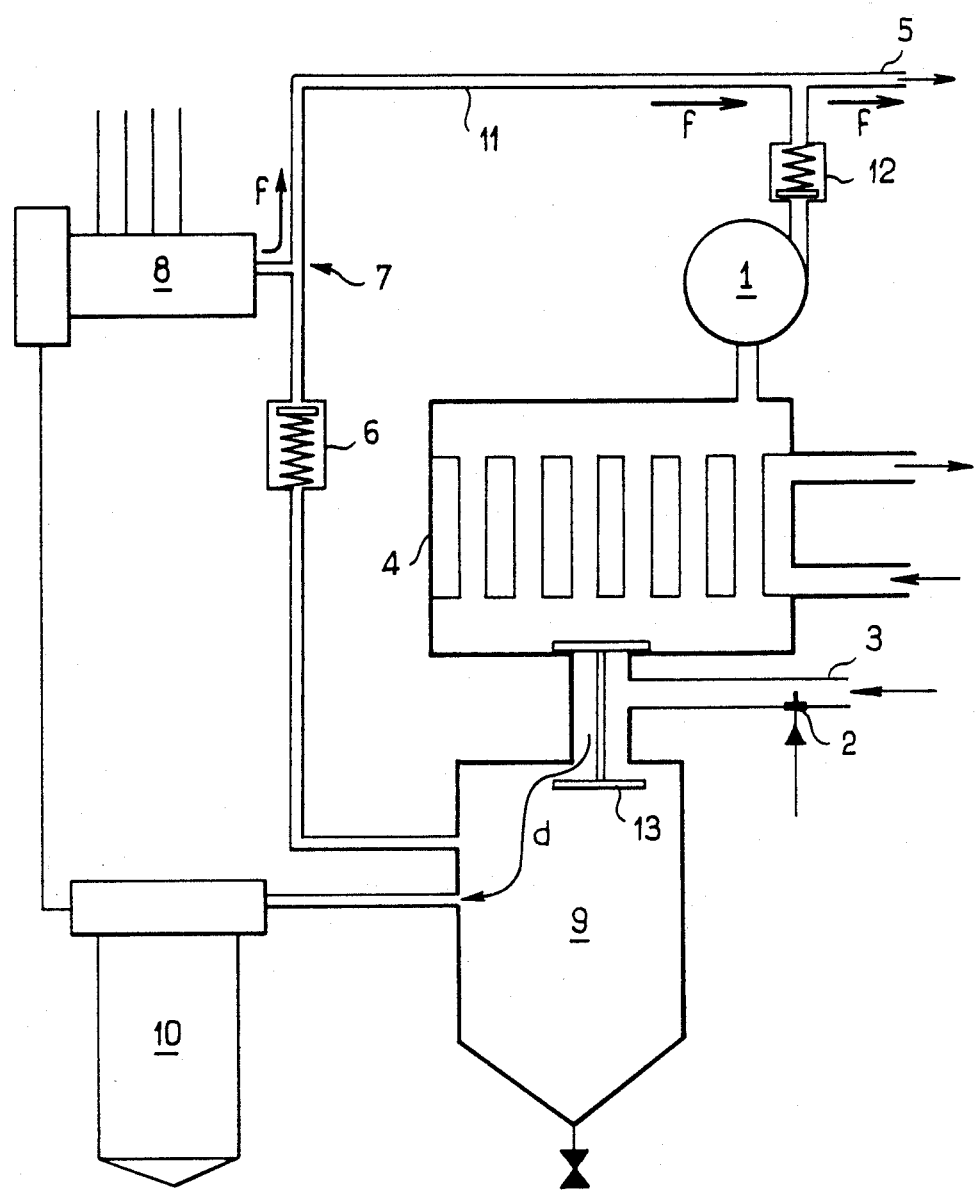
FIG. 2 shows the improvement of the invention in its operating mode when the whole of the gas oil in the reservoir has been heated.

FIG. 2 shows the operation of the device, when the intake temperature of the gas oil at the level of the thermocontact 2 exceeds 10° Celsius. In this case, the circulation pump 1 stops operating, valve 13, through the differential pressures, closes the communication of duct 30 with exchanger 4 and the feed takes place in a conventional way, in the direction of arrow d. The gas oil coming from the reservoir through duct 3 flows directly into the mixing pot 9 so as to pass through the fuel filter 10. The fluid delivered by the scavenging outlet 7 does not leave at a sufficient pressure to open the second valve 6 and will flow in duct 11 in the direction of arrow f and return to the reservoir. The first valve 12 prevents the return flow, in the direction of arrow f, from passing again towards the excess pressure pump 1. Thus, at the outlet of the injection pump 8, the scavenging flow can only go towards duct 11 then to duct 5 for returning to the reservoir, since the second valve 6 prevents recycling because of the absence of excess pressure. Exchanger 4 thus isolated from the rest of the circuit does not allow the gas oil to be heated in this configuration. Furthermore, it will be noted that the circulating pump 1 will be chosen so as to have a flow rate making possible complete cycling of the reservoir in an hour so as to heat the fluid contained therein in the same time.

Figure 3:
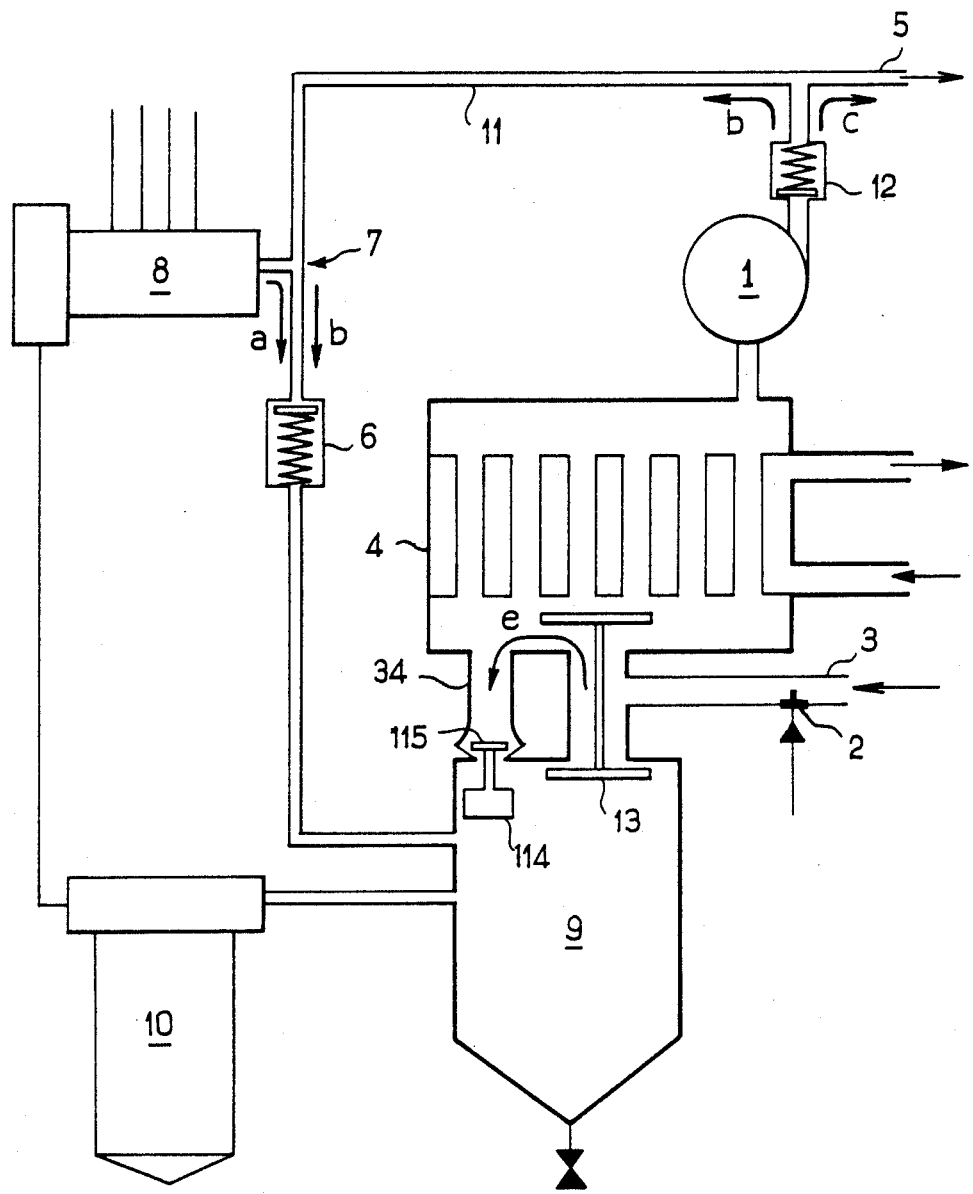
FIG. 3 shows an alternate embodiment of to the present invention.

FIG. 3 shows a variant of the invention which differs from the construction of FIGS. 1 and 2 by the fact that a duct 34, connecting exchanger 4 with the mixing pot 9, is closed by a valve 115 controlled by a supplement thermostatic valve 114.

With this modification, the operation of the device of the invention is as follows.

If recycling of the scavenging flow causes an excessive temperature in the mixing pot 9 and consequently overheating of the supplement injection pump 8, the thermostatic element 114 controls the opening of valve 115 so as to temporarily stop recycling as long as the latter is operating. The opening of valve 115 makes direct feed possible by the gas oil coming from the exchanger 4 in the direction of arrow e. The thermostatic element 114 will be set so that opening of valve 15 is complete at 30° Celsius.

With this variant, whatever the conditions, the feed temperature of the injection pump can be kept constant and the performances of the vehicle thus maintained.

Thus, using the means described above, the injection pump 8 is cooled and the injection gas oil is heated by the scavenging flow during the start-up phase and, finally, heating of of all of the gas oil contained in the circuit and the reservoir, without causing overheating of the injection pump or an oscillatory phenomena.

Obviously, numerous modifications and variations of the present invention are possible in light of the above teachings. It is therefore to be understood that within the scope of the appended claims, the invention may be practiced otherwise than as specifically described herein.

I claim:

1. A device for improving the feed of diesel engine at low temperatures, particularly at temperatures less than the clouding point of gas oils, without modifying the specific chemical characteristics of the gas oil by recycling the scavenging flow from an injection pump, comprising:

a reservoir having an outlet portion;
a fuel filter in communication with said outlet portion of said reservoir;
a heat exchanger located upstream of said reservoir;
an excess pressure pump connected to an outlet portion of said heat exchanger;
a one-way valve in communication with said fuel filter; and
a thermoelectric element located at said outlet portion of said reservoir for controlling operation of said excess pressure pump such that recycling takes place either upstream of said fuel filter and is associated with recirculation toward said reservoir of a gas oil coming from said reservoir through said heat exchanger, or directly in the direction of the reservoir with direct feed of said fuel filter by said reservoir, said recycling being controlled by said thermoelectric element and providing, on the one hand through opening of said valve, recycling of scavenging flow upstream of said filter and, on the other, recirculation towards the reservoir of the gas oil communicated from the reservoir through said heat exchanger.

2. The device according to claim 1 further comprising a differential value in communication with said outlet portion of said reservoir for placing the reservoir in communication either with the heat exchanger or directly with the filter.

3. The device according to claim 2, further comprising an injection pump in communication with said filter and said valve and having a scavenging outlet; a return duct from said excess pressure pump to said reservoir; and a nonreturn valve disposed between the excess pressure pump and said return ducts.

4. The device according to claim 1, further comprising a direct feed duct interconnecting said heat exchanger with said filter and a supplemental thermostatic element for controlling said direct heat valve and for placing said heat exchanger in direct communication with said filter through said direct feed duct.

* * * * *